(12) United States Patent
Alston et al.

(10) Patent No.: US 8,900,803 B2
(45) Date of Patent: Dec. 2, 2014

(54) METHOD FOR MARKING A SUBSTRATE

(75) Inventors: Christopher Alston, Warrimoo (AU);
Greg Brunton, Sydney (AU); Peter Pagones, Sydney (AU); Joseph Sanegor, Sydney (AU)

(73) Assignee: James Hardie Technology Limited, Dublin (IE)

( * ) Notice: Subject to any disclaimer, the term of this patent is extended or adjusted under 35 U.S.C. 154(b) by 403 days.

(21) Appl. No.: 13/163,864

(22) Filed: Jun. 20, 2011

(65) Prior Publication Data

US 2012/0021194 A1      Jan. 26, 2012

(51) Int. Cl.
| | | |
|---|---|---|
| C04B 41/00 | (2006.01) |
| B28D 1/00 | (2006.01) |
| B23K 26/00 | (2014.01) |
| C04B 41/60 | (2006.01) |

(52) U.S. Cl.
CPC ........... *C04B 41/009* (2013.01); *B23K 26/0039* (2013.01); *B23K 26/00* (2013.01); *B23K 26/0021* (2013.01); *C04B 41/0045* (2013.01); *B28D 1/00* (2013.01); *C04B 41/0036* (2013.01); *C04B 41/60* (2013.01)
USPC ............................ 430/346; 347/225; 264/446

(58) Field of Classification Search
CPC C04B 41/00; C04B 41/0036; C04B 41/0045; B28D 1/00; B44C 1/00; B23K 26/00; B23K 26/0006; B23K 26/0021; B23K 26/0039
USPC ........ 219/121.16, 121.17, 121.35; 250/492.1; 427/554; 347/225; 264/446; 430/346
See application file for complete search history.

(56) References Cited

U.S. PATENT DOCUMENTS

| | | |
|---|---|---|
| 5,538,764 A | 7/1996 | Li |
| 5,554,335 A | 9/1996 | Fields |
| 5,673,489 A | 10/1997 | Robell |
| 5,842,280 A | 12/1998 | Robell |
| 6,049,987 A | 4/2000 | Robell |

(Continued)

FOREIGN PATENT DOCUMENTS

| | | |
|---|---|---|
| AU | 198060655 | 3/1981 |
| AU | 2005100347 | 5/2005 |

(Continued)

OTHER PUBLICATIONS

Gokce et al., "Bond Strengths of All-Ceramics: Acid vs Laser Etching." Operative Dentistry 32 (2) 173-178 Mar. 2007.

(Continued)

*Primary Examiner* — Samuel M Heinrich
(74) *Attorney, Agent, or Firm* — Knobbe, Martens, Olson & Bear, LLP (57) ABSTRACT

The present invention relates to methods for marking a substrate. In particular, the present invention relates to methods for applying visual indicia to a substantially cementitious substrate in the form of a cementitious building product. The method comprising the steps of: irradiating a surface of said substantially cementitious substrate for a sufficient time and with sufficient energy to at least partially vitrify said surface thereby marking said substrate.

11 Claims, 9 Drawing Sheets

(56) References Cited

U.S. PATENT DOCUMENTS

| | | |
|---|---|---|
| 6,115,926 A | 9/2000 | Robell |
| 6,635,846 B1 | 10/2003 | Rieck |
| 6,822,192 B1 | 11/2004 | Young |
| 2004/0137201 A1 | 7/2004 | Hannan |
| 2004/0197490 A1* | 10/2004 | Rieck ............................ 427/553 |
| 2005/0208285 A1 | 9/2005 | Lyons |
| 2006/0288909 A1 | 12/2006 | Naji |
| 2007/0108170 A1 | 5/2007 | Costin |
| 2010/0006546 A1 | 1/2010 | Young |

FOREIGN PATENT DOCUMENTS

| | | | |
|---|---|---|---|
| EP | 2048125 | | 10/2007 |
| GB | 375045 | | 6/1932 |
| GB | 2423498 | | 7/2007 |
| JP | 22 79573 | | 4/1989 |
| JP | 03174376 | | 9/1989 |
| JP | 03033080 A | * | 2/1991 |
| JP | 4292488 | | 3/1991 |
| JP | 2001253763 A | * | 9/2001 |
| JP | 2005226303 | | 2/2004 |
| JP | 2005238075 | | 2/2004 |
| JP | 2006088106 | | 9/2004 |
| WO | WO98/45222 | | 10/1998 |
| WO | WO01/68547 | | 9/2001 |

OTHER PUBLICATIONS

Cavalcanti et al., "Bond Strength of Resin Cements to a Zirconia Ceramic with Different Surface Treatments." Operative Dentistry 34 (3) 280-287 May 2009.

Laser Edge Designs: Surfaces http://www.laseredgedesigns.com/surfaces.htm, downloaded Feb. 8, 2011.

Terro White Laser Engraved Bricks—A guide to the Process http://ezinearticles.com/? Laser-Engraved-Bricks--A-Guide-to-the-Process&id=4190198, downloaded Feb. 8, 2011.

Applications of Laser Dentistry: A Review: http://articlescbase.com/dental-care-articles/applications-oflasers-in-dentistry-a-review-2074376.html.

EJ Melendeza et al. "Effect of laser-etch on bond strengths of glass ionomers." The Journal of Prosthetic Dentistry 67 3 307-312 Mar. 1993.

UKIPO Search Report for priority filing GB1010332.3 dated Oct. 27, 2010.

IPONZ Examiner's First Report for 593589 dated Jun. 24, 2011.

UKIPO Search Report for priority filing GB1010346.3 dated Oct. 27, 2010.

IPONZ Examiner's First Report for 593590 dated Jun. 24, 2011.

* cited by examiner

Laser marked section

Fig. 7

Black formation post irradiation

Fig. 8

Interface of cellulose fibre and laser marked region

METHOD FOR MARKING A SUBSTRATE

BACKGROUND OF THE INVENTION

The present invention relates to methods for marking a substrate. In particular, the present invention relates to methods for applying visual indicia to a substantially cementitious substrate in the form of a cementitious building product, and will be described hereinafter with reference to this application. However, it will be appreciated that the invention is not limited to this particular field of use. The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field. The prior art discloses various methods to mark substrates. For example, it is known to use ink-jet printing methods to apply visual indicia to, for example, a building product such as a sheet of fibre cement. The visual indicia can take many forms, such as to indicate the source of the product, or product specifications, or product barcodes, trademarks, or other descriptors, etc. It is also known to print other visual indicia for the convenience of the installer, such as measurement markings, measurement grids, nailing guides, etc. For example see U.S. Pat. No. 5,673,489, U.S. Pat. No. 5,842,280, U.S. Pat. No. 6,115,926 and U.S. Pat. No. 6,049,987 to Robell which disclose various printing methods for printing visual indicia on wallboards, including ink-jet printing, screen printing and pad printing. However, these printing processes are costly and difficult to use. For example the ink adds cost to the final product and, for example, the ink-jet printing heads require constant maintenance and can relatively easily break down during production. Further, it will be appreciated that the entire intended visual marking can be ruined if but one of the many ink-jet heads fails or becomes blocked during use, thereby causing the product to be "faulty", even if the substrate is fit for purpose. Also, re-working a sheet having an applied marking which is faulty is clearly inconvenient and costly.

What is needed is a way to mark a substrate which is substantially cementitious in composition without the need for relatively expensive inks, and without using relatively delicate printing equipment.

It is an object of the present invention to overcome or ameliorate at least one of the disadvantages of the above-mentioned prior art, or to provide a useful alternative.

SUMMARY OF THE INVENTION

According to a first aspect the present invention provides a method for marking a substantially cementitious substrate, the method comprising the steps of:
 irradiating a surface of said substantially cementitious substrate for a sufficient time and with sufficient energy to at least partially vitrify said surface thereby marking said substrate.

Preferably the method of the invention vitrescently marks said substantially cementitious substrate. Preferably the method of the invention vitrescently marks the substantially cementitious substrate without significant surface ablation. Preferably the substrate is an uncured or "green" cementitious body. Preferably the method for marking a substantially cementitious substrate is a method for applying indicia.

According to a second aspect the present invention provides a vitrescently marked substantially cementitious substrate.

According to a further aspect the present invention provides a substantially cementitious substrate vitrescently marked by the method according to the first aspect.

As used throughout this specification, the term vitrification should be construed as a process of converting a material into a glass-like amorphous solid which is substantially free of any crystalline structure. Typically, vitrification of a material is achieved by exposing the material to heat. A vitrescent material is one which is vitrifyable.

Preferably the substrate is hydraulically bonded and comprises fibre reinforcement. Preferably the fibre reinforcement is cellulose. Preferably the substrate is unfired and may predominantly comprise hydrated silicates of calcium. Preferably the substrate is hydrated and may have a water content of between about 8 to 40%. The water content of the cementitious substrate comprises bound and unbound water. In one embodiment, preferably the water content of the substrate is not removed prior to vitrification/irradiation. However, in another embodiment preferably the water content of the substrate is reduced prior to vitrification/irradiation. Preferably the substrate is unfired (i.e. not a fired ceramic).

The substrate is irradiated with an energy source, which in preferred embodiments is a laser. However, the skilled person will appreciate that other sources of energy could be used. Preferably the laser is an Nd:YAG, excimer, or carbon dioxide laser and the wavelength(s) of laser light are chosen to vitrify the substrate. Preferably the substrate is irradiated for a sufficient time and with sufficient energy to at least partially vitrify the surface thereby marking the substrate and without ablation of the surface. At least partial vitrification of the substrate may be achieved by using laser power densities of between about 500 to 15,000 W/cm$^2$. The skilled person will appreciate that the laser spot size may be any size to suit the intended size and shape of the intended indicia to be marked, however spot sizes between about 0.3 to 1 mm diameter are particularly preferred for relatively large markings and 0.15 to 0.22 mm diameter for small and intricate patterns, such as a barcode. Preferably the substrate is not substantially heated during the irradiation process and only localised heating is applied.

The present invention enables visual indicia to be applied to a cementitious substrate without the added cost of relatively expensive inks, and without using relatively delicate equipment. To explain, the present invention utilises a laser to mark a cementitious substrate, which is preferably a fibre cement building product. The skilled person will appreciate that lasers are relatively inexpensive and are relatively robust, and operate without the need for consumables and with minimal maintenance. Lasers are also particularly useful in a dirty industrial manufacturing setting, for example the laser can be housed in a remote location from the substrate being marked and the laser light conveniently delivered to the cementitious substrate by way of fibre optics.

Lasers have been used previously to treat cementitious substrates, for example as disclosed in U.S. Pat. No. 5,538,764 to Li et al (hereinafter "Li et al."). This document teaches how to ablate the surface of a contaminated concrete substrate by the use of high power laser energy (energy densities of 2500 to 5000 W/cm$^2$ using a 400 to 1500 W laser). The thermal stresses generated in the surface of the substrate by the very high laser energies cause the surface to be detached from the bulk substrate. The document also teaches that the rate of removal may be assisted by increasing the water content of the substrate to increase the vapour pressure. However, this document does not teach how to form a retained marking on the surface of a cementitious substrate, nor does it teach how to provide a colour change. The document does not teach how to produce a controlled vitrification of the surface of the substrate.

According to a further aspect the present invention provides a method for applying indicia to a substantially cementitious substrate, the method comprising the steps of:

irradiating a surface of said substantially cementitious substrate for a sufficient time and with sufficient energy to at least partially vitrify said surface to form a visual indicia on said substrate.

Lasers have also been used previously to treat other substrates to effect marking thereon, however these substrates have been "doped" with certain compounds which are known for use as pigments for producing brown and black glass, for example carbon, iron and sulphur compounds. The present invention avoids the use of such dopants or sensitisers.

Lasers have also been used previously to mark certain high clay content ceramic substrates, such as bricks and pavers. For example see U.S. Pat. No. 6,635,846 to Rieck (hereinafter "Rieck"). The skilled person will readily appreciate that ceramic substrates such as bricks and pavers contain no hydrated mineral phases since ceramic materials are fired to temperatures between about 700 and 1400° C., and at temperatures above approximately 750° C. almost all of the chemically bound water is driven off and partial vitrification of the remaining material takes place. The skilled person will also appreciate the differences between a fired ceramic material and a non-fired ceramic material, such as a cementitious composition.

Rieck also teaches a process to mark a high clay content ceramic substrate wherein the substrate and at least one marking material are placed in reactive contact with each other and the substrate and the marking material are vitrified to form a vitrescent marking below the outer surface of the substrate. The document teaches that in order to achieve vitrification the substrate must be almost completely dry prior to vitrification, and when physically absorbed moisture is present, the laser energy necessary for vitrification is lost converting water to steam. For example the document teaches that the moisture content of the bricks are usually 2 to 8%, but must be reduced to about 0.75% or less to achieve laser vitrification. This may be achieved by heating to about 40° C. prior to vitrification. This document also teaches that very high energy densities are required to mark a previously fired ceramic, for example $1.6 \times 10^5$ to $1.4 \times 10^6$ to W/cm².

Further Rieck teaches that cement is a non-vitrescent object, and that cement can be vitrescently marked by adding clays (aluminosilicates) and colorant carrier to the substrate. However, the present applicant has found that a cementitious substrate may be vitrescently marked without the need for adding significant clay content to the substrate. Further, it has been discovered that laser marking of substantially cementitious substrates is possible without the need for supplying a marking material and placing the marking material in reactive contact with the substrate.

In contrast to the teachings of the prior art, it has now been discovered that substantially cementitious materials may be vitrescently marked by the methods of the present invention. Without wishing to be bound by theory, it is believed that cementitious materials can be marked by laser irradiation by the judicious selection of laser energies. For example, energy densities of greater than 2500 W/cm² will cause ablation, as discussed above, however delivering an energy density of laser light of between about 500 to 1500 W/cm² will cause marking without ablation. Of course the total energy delivered to the substrate is also an important factor and is a function of laser power, spot size and speed of travel over the surface being marked.

Further, it has been discovered that the substrate does not need to be completely dry, as in the case of ceramic materials, and the marking process will tolerate a significant water content. However, if the substrate contains too much moisture then either ablation could occur or it is likely that the marking may occur but just at a slower rate compared to a substrate which contains less water, since some of the laser energy will be lost to converting water to steam. The typical water content of green FRC is between about 35 to 50% and cured FRC is about 8 to 15%.

Without wishing to be bound by theory, it is also believed that the properties of the fibre cement substrate itself enable vitrescent marking of the substrate. These properties comprise:

1.) relatively high porosity compared to concrete—namely, porosities between about 15 to 70%;
2.) relatively low density compared to concrete—typically between about 0.8 g·cm⁻³ and 1.7 g·cm⁻³, compared to 2.5 to 3.0 g·cm⁻³ for concrete; and/or
3.) the mechanical properties of fibre cement compared to concrete—namely, concrete is relatively brittle compared to fibre-reinforced cement.

Without wishing to be bound by theory, the density/porosity of the substrate may be important since the porosity may be sufficiently high in a fibre cement product to accommodate steam generation and yet not ablate.

Without further wishing to be bound by theory, it is believed that the porous fibre cement substrate increases the depth of marking compared to a cementitious substrate without having fibre reinforcement, and in particular cellulose fibre reinforcement.

Further, and again without wishing to be bound by theory, it is believed that as the cellulose fibre is "burnt-out" of the matrix within which it is dispersed during irradiation, the cellulose decomposition products provide a relatively reduced oxygen atmosphere or micro-environment during irradiation, i.e. a reducing atmosphere, which causes discolouration of the inorganic components of the matrix which are at least partially melted during irradiation. The discolouration may be due to the modified oxidation states of compounds such as $TiO_2$ to form $Ti_3O_5$; and $Fe_2O_3$ to form $Fe_3O_4$; etc, in the reducing atmosphere. The changed oxidation stages cause a perceptible colour change. Partial melting may also result in "coagulation" of the solid phase to leave relatively larger pores in laser-irradiated areas. However, the laser marking method may be adapted to leave relatively smaller pores in the remaining vitrified material.

Typical Fibre Cement or Cement-Based Substrates

A variety of fiber cement board substrates may be employed in the present invention. The disclosed substrates typically include cement and a filler. Exemplary fillers include wood, fiberglass, polymers or mixtures thereof. The substrates can be made using methods such as extrusion, the Hatschek method, or other methods known in the art. See, e.g., U.S. Patent Application No. 2005/0208285 A1 (corresponds to International Patent Application No. WO 2005/071179 A1); Australian Patent Application No. 2005100347; International Patent Application No. WO 01/68547 A1; International Patent Application No. WO 98/45222 A1; U.S. Patent Application Nos. 2006/0288909 A1 and 2006/0288909 A1; and Australian Patent Application No. 198060655 A1. Non-limiting examples of such substrates include siding products, boards and the like, for uses including fencing, roofing, flooring, wall boards, shower boards, lap siding, vertical siding, soffit panels, trim boards, shaped edge shingle replicas and stone or stucco replicas. One or both major surfaces of the substrate may be profiled or embossed to look like a grained or roughsawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include cement board products from Knauf USG Systems GmbH & Co. KG of Iserlohn, Germany, CEMPLANK™, CEMPANEL™ and CEMTRIM™; WEATHERBOARDS™ cement board products from CertainTeed Corporation of Valley Forge, Pa.; MAXITILE™, MAXISHAKE™ and MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

Whilst fibre cement substrates have been illustrated in the foregoing, it will be appreciated that other cementitious substrates fall within the purview of the present invention.

It has also been surprisingly found that a substantially cementitious substrate may be marked by the method of the invention before curing or after curing with a similar result. To explain, a green-sheet (an uncured sheet) of cementitious substrate can be marked and subsequently cured, whether air, steam or autoclave cured, or alternatively, an air, steam or autoclave cured substrate may be cured and then marked, and the resultant markings are substantially identical.

BRIEF DESCRIPTION OF THE DRAWINGS

Preferred embodiments of the invention will now be described, by way of example only, with reference to the accompanying drawings in which.

DEFINITIONS

In describing and claiming the present invention, the following terminology will be used in accordance with the definitions set out below. It is also to be understood that the terminology used herein is for the purpose of describing particular embodiments of the invention only and is not intended to be limiting. Unless defined otherwise, all technical and scientific terms used herein have the same meaning as commonly understood by one having ordinary skill in the art to which the invention pertains.

The terms "predominantly" and "substantially" as used herein shall mean comprising more than 50% by weight, unless otherwise indicated.

Other than in the operating examples, or where otherwise indicated, all numbers expressing quantities of ingredients or reaction conditions used herein are to be understood as modified in all instances by the term "about". The examples are not intended to limit the scope of the invention. In what follows, or where otherwise indicated, "%" will mean "weight %", "ratio" will mean "weight ratio" and "parts" will mean "weight parts".

The recitation of a numerical range using endpoints includes all numbers subsumed within that range (e.g., 1 to 5 includes 1, 1.5, 2, 2.75, 3, 3.80, 4, 5, etc.).

The term "board" refers to a generally planar component suitable for attachment to a building exterior surface, including but not limited to lap siding, vertical siding, soffit panels, trim boards, shingle replicas, stone replicas and stucco replicas.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The terms "a", "an" and "the" mean "one or more", unless expressly specified otherwise.

Headings of sections provided in this patent application and the title of this patent application are for convenience only, and are not to be taken as limiting the disclosure in any way.

PREFERRED EMBODIMENT OF THE INVENTION

Throughout the figures presented herein like features have been given like reference numerals. The present invention will now be described with reference to the following examples which should be considered in all respects as illustrative and non-restrictive.

Figure 1A:
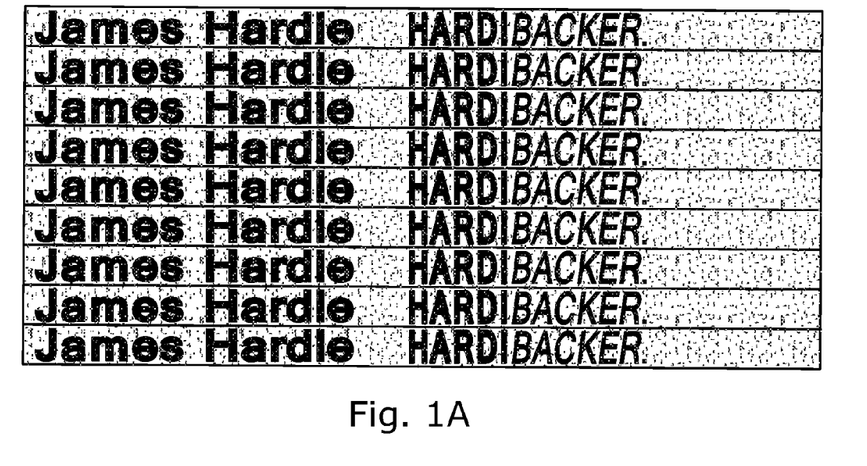
FIGS. 1A and 1B show the effects of $CO_2$ laser marking on the sides of autoclaved fibre cement sheets.
Figure 1B:
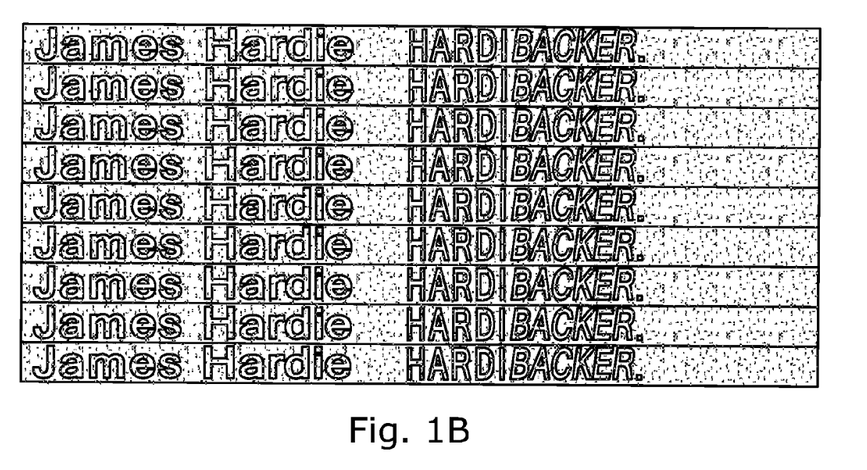
Figure 2:
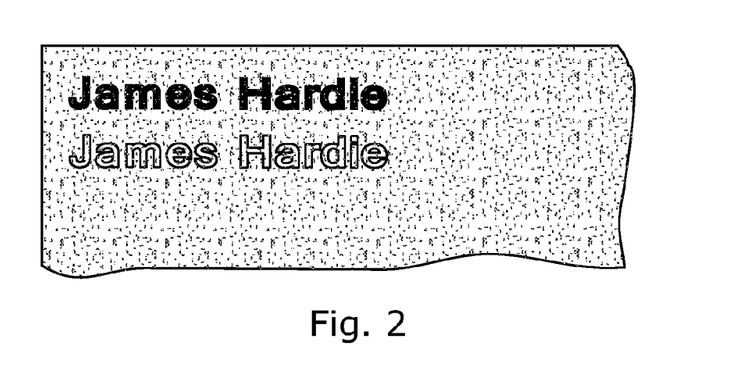
FIG. 2 shows the effects of laser marking on the front face of an autoclaved fibre cement sheet.
Figure 3:
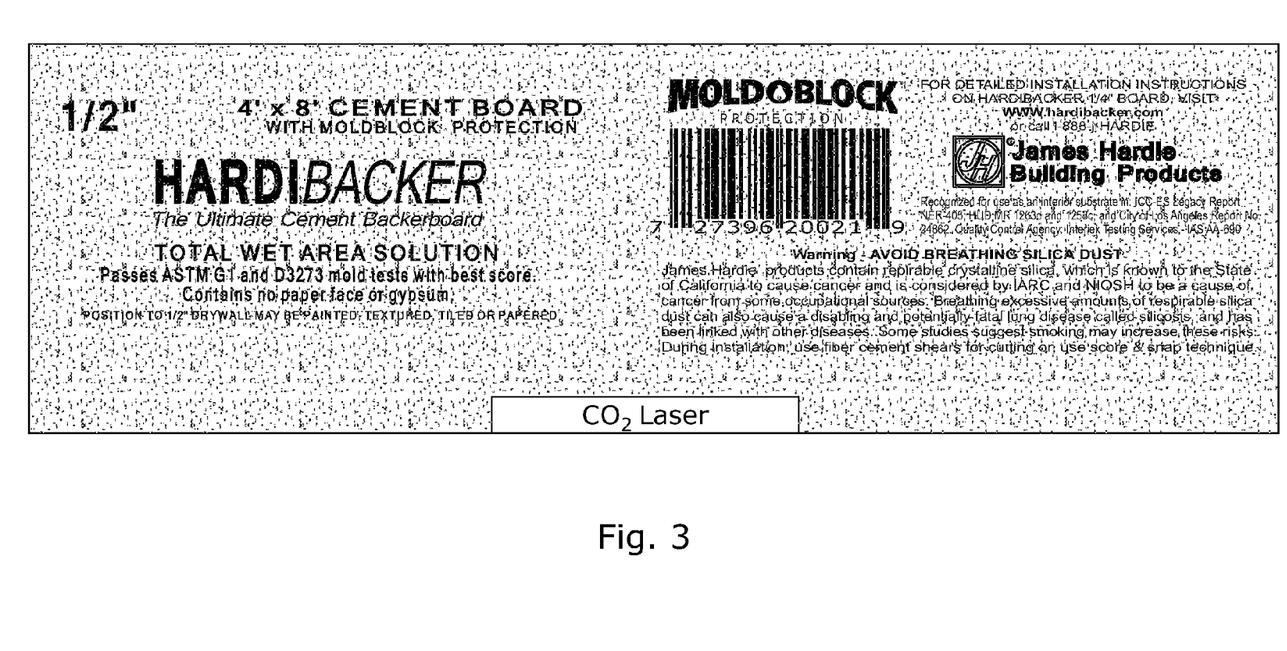
FIG. 3 shows the effects of $CO_2$ laser marking on the front face of an autoclaved fibre cement sheet (laser power=30 W)
Figure 4:
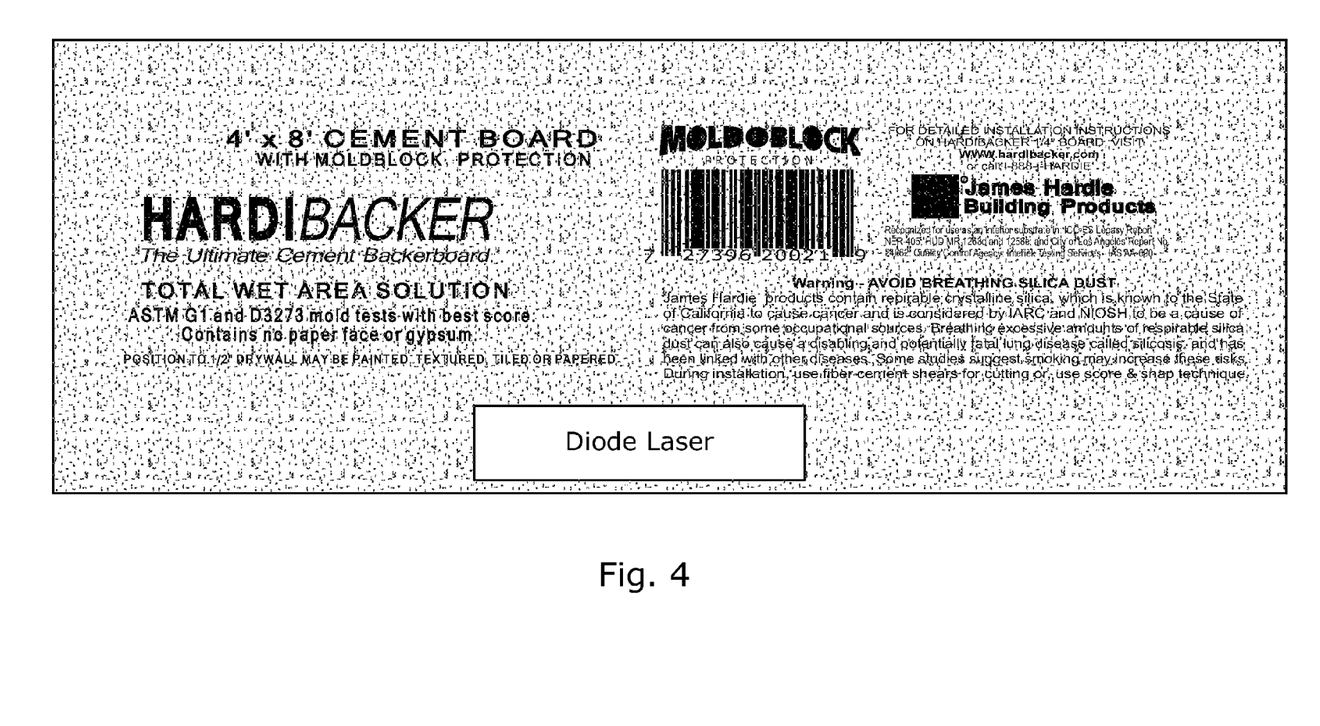
FIG. 4 shows the effects of diode laser marking on the front face of an autoclaved fibre cement sheet (laser power=100 W)
Figure 5:
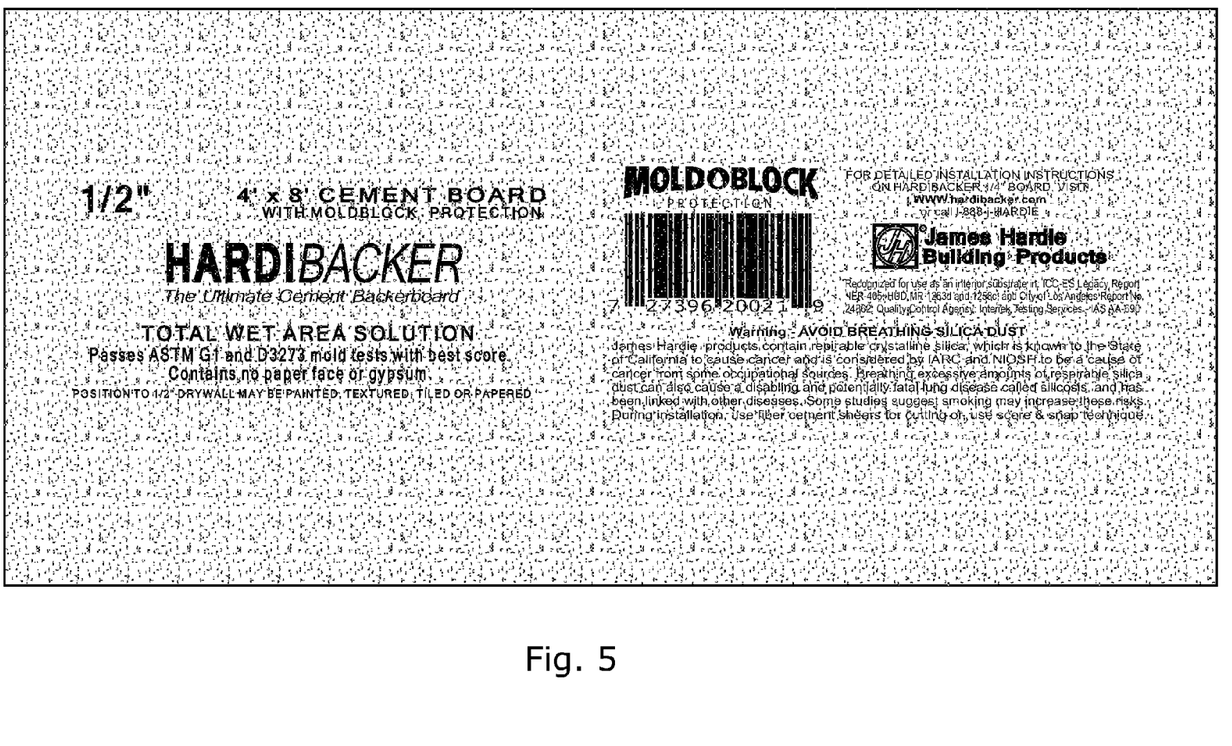
FIG. 5 shows the effects of $CO_2$ laser marking on the front face of a pre-autoclaved (green) fibre cement sheet.

Autoclaved fibre cement sheets were irradiated with a $CO_2$ laser on both side and face surfaces (see FIGS. 1 to 3). Various surface patterns and markings are achievable, for example the outline of letters, filled/solid letters, barcodes, trademarks, product labels and installation instructions, etc. See also FIGS. 3 and 4 which show the results of the use of different laser types. The laser marking as shown in FIGS. 1 to 4 were applied to autoclaved sheets. However, comparable results are also achievable on pre-autoclaved sheets (i.e. green sheets), as can be seen in FIG. 5.

Figure 6:
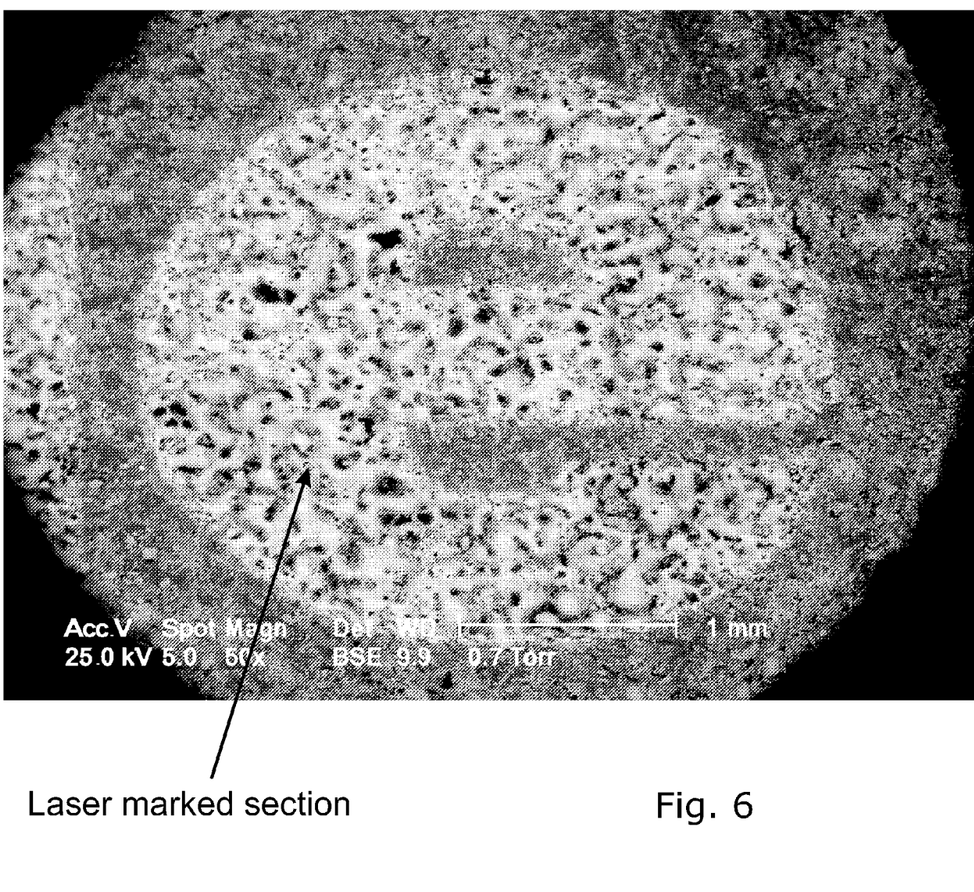
FIG. 6 shows a magnified view (50×) of laser marking of an autoclaved fibre cement sheet.
Figure 7:
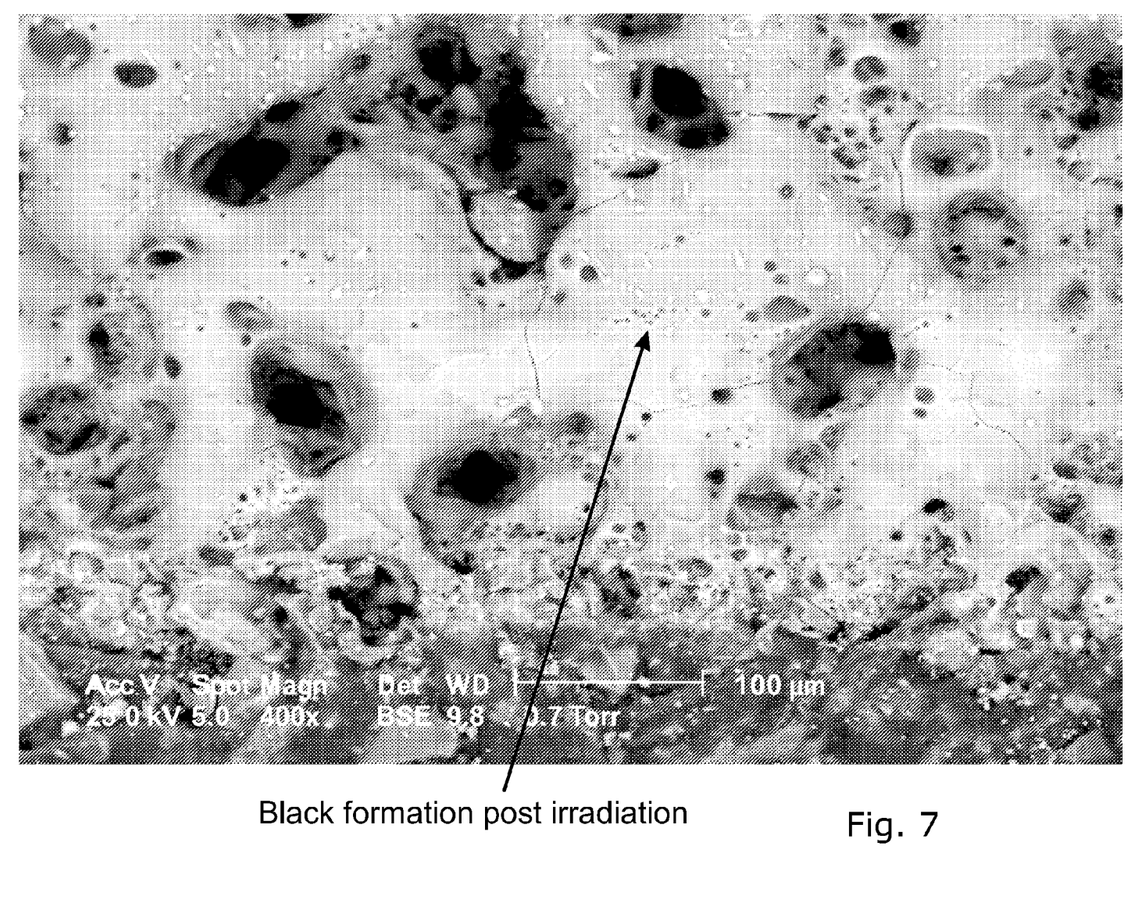
FIG. 7 shows a magnified view (400×) of laser marking of an autoclaved fibre cement sheet.
Figure 8:
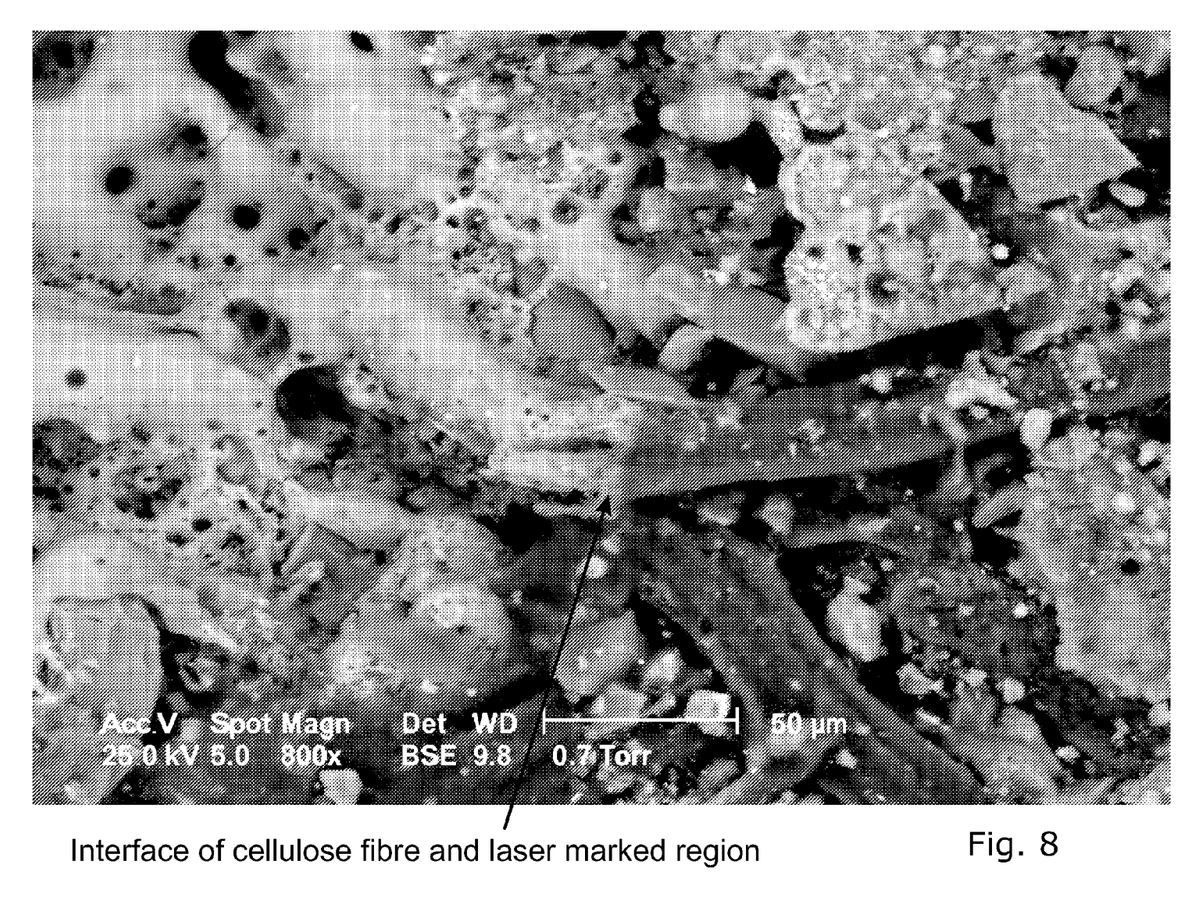
FIG. 8 shows a magnified view (800×) of laser marking of an autoclaved fibre cement sheet.

Environmental Scanning Electron Microscope (ESEM) analysis was performed on laser marked samples to ascertain what kind of phase transformations occur during laser irradiation and to determine what constitutes the main component of the black colour that is observed after marking. FIG. 6 shows a magnified view of the results of laser marking. It is evident that the laser marking leaves very sharp and defined lines. In this Figure it can be seen that the morphology of the etched letter is different to the surrounding substrate. Further magnification at 400× reveals that there is a brittle glassy phase formed after laser marking and there is slight cracking evident in newly formed phase. Even at this magnification, a clear defining line between marked and non-marked is evident at the bottom of the image. Further magnification at 800× confirms burning of the cellulose fibre reinforcement at this temperature. FIG. 8 clearly shows how a cellulose fibre is intact in the matrix up until the portion that has been exposed to the laser beam. Therefore, the cellulose material is removed from the matrix at the laser marked surface and a glassy dark solid is formed in this area.

Figure 9:
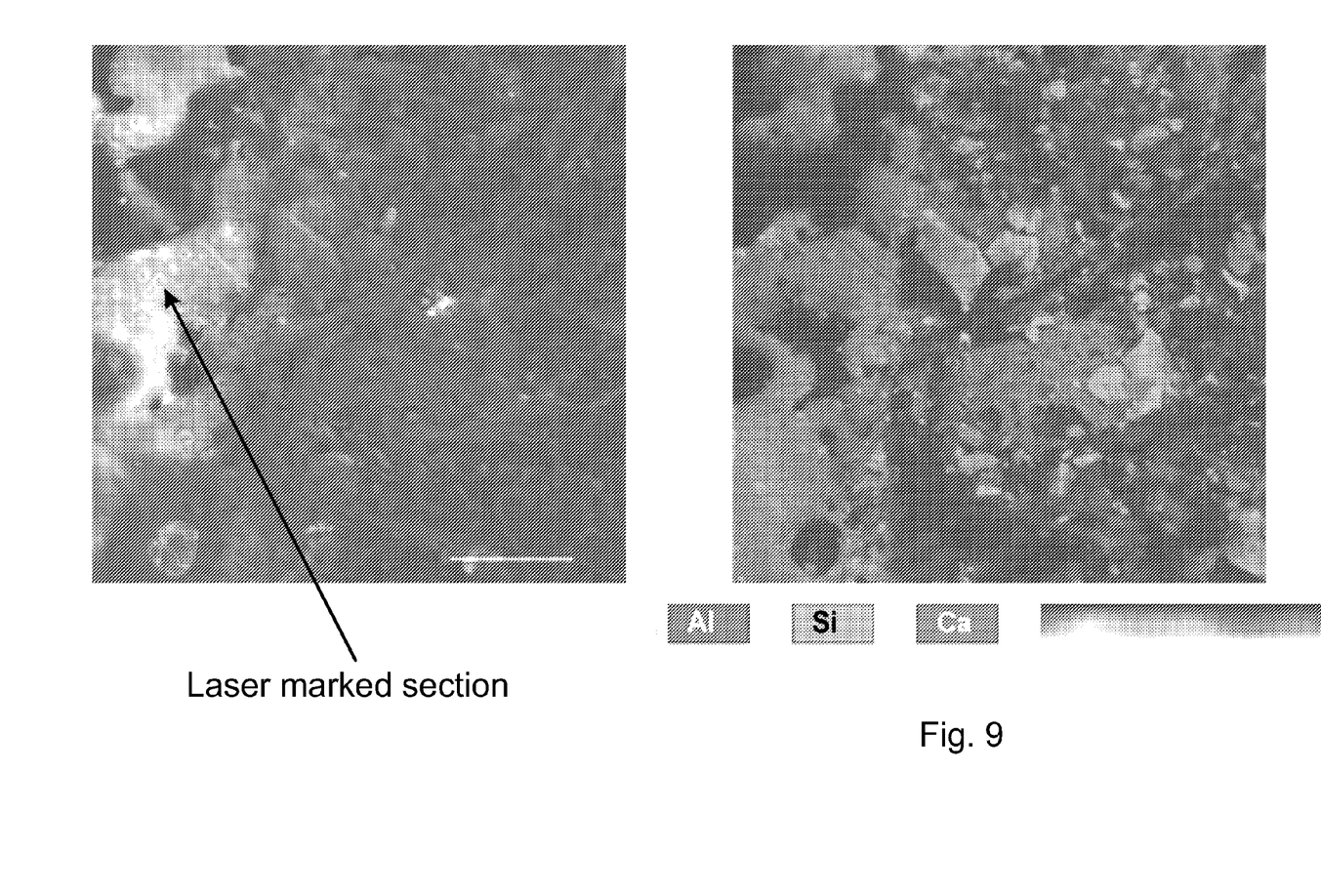
FIG. 9 shows X-Ray Mapping of the laser marking of an autoclaved fibre cement sheet.

Elemental analysis was performed to identify the main components of the black glassy solid that remains after laser marking. Turning now to FIG. 9, the portion of the image on the left is the laser marked region while the darker region is the unmarked fibre cement matrix. It was found that the black glassy residue is rich in silicon, which indicates that this residue is a mixture of fused silica with other components to form a black glassy vitrified material. It would appear that the silica particles in the matrix are melting and fusing with surrounding particles to form this black glassy vitrified material.

Figure 10:
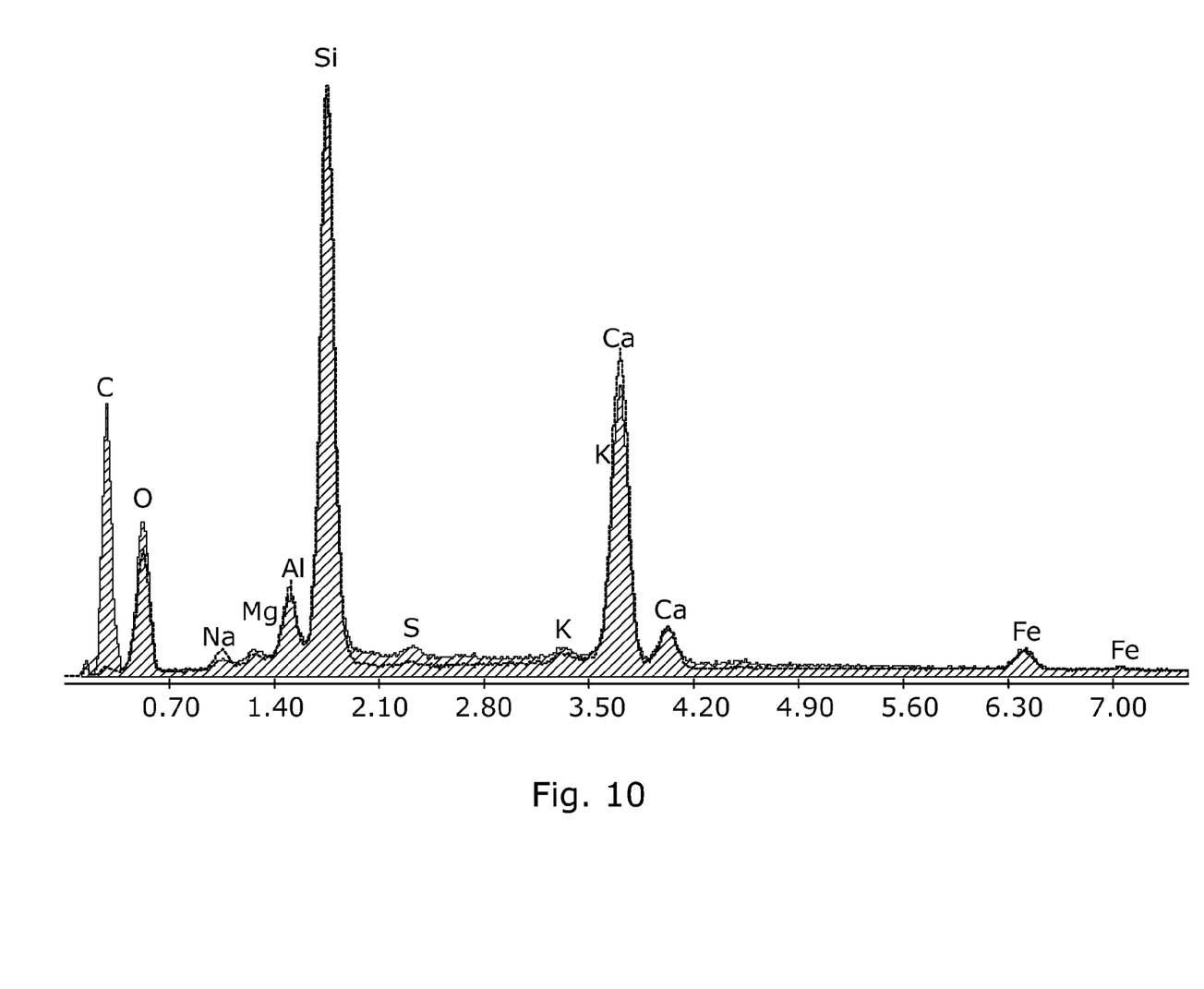
FIG. 10 shows elemental analysis of the X-Ray Mapping of the laser marking of an autoclaved fibre cement sheet.

FIG. 10 shows an elemental breakdown pre and post laser marking (bars=pre-marked, and solid line=post-marked). Analysis of this figure reveals that a substantial amount of carbon is removed from the substrate during laser marking. This further supports the conclusion that the cellulose fibre is "burnt out" of the matrix during laser marking.

Although the invention has been described with reference to specific examples, it will be appreciated by those skilled in the art that the invention may be embodied in many other forms. In particular features of any one of the various described examples may be provided in any combination in any of the other described examples.

We claim:

1. A method for marking a substantially cementitious substrate of a building material, the method comprising the steps of: providing an uncured or "green" cementitious body, irradiating a surface of said uncured or "green" cementitious body to partially vitrify said surface of the uncured or "green" cementitious body thereby marking said substrate without substantial surface ablation, wherein the cementitious body has a water content of between about 8 to 40%, a porosity between about 15 to 70%, and a density of about 0.8 to 1.7 $g/cm^3$.

2. A method according to claim 1 wherein said marking is a vitrescent mark.

3. A method according to claim 1 wherein said substrate is hydraulically bonded and comprises fibre reinforcement.

4. A method according to claim 3 wherein said fibre reinforcement is cellulose fibre.

5. A method according to claim 1 wherein said substrate is substantially devoid of hydrated silicates of aluminum and predominantly comprises hydrated silicates of calcium.

6. A method according to claim 1 wherein the water content of the substrate is not removed prior to irradiation.

7. A method according to claim 1 wherein water content of the substrate is reduced prior to irradiation.

8. A method according to claim 1 wherein said substrate is irradiated with an energy source in the form of a laser.

9. A method according to claim 8 wherein the wavelengths of laser light are chosen to vitrify said substrate.

10. A substantially cementitious substrate vitrescently marked by the method according to claim 1.

11. A method for applying indicia to a substantially cementitious substrate of a building material, the method comprising the steps of: providing an uncured or "green" substantially cementitious substrate comprising cellulose fibers, irradiating a surface of said uncured or "green" substantially cementitious substrate having a water content of 35 to 50% without placing a marking material in reactive contact with the substrate, wherein the surface of the uncured or "green" substantially cementitious substrate is irradiated for a sufficient time and with sufficient energy to at least partially vitrify said surface to form a visual indicia on said substrate, wherein at least some of the cellulose fibers are burnt out and removed so as to form a glassy dark solid in the configuration of the visual indicia.

* * * * *